United States Patent
Ebinuma et al.

(10) Patent No.: US 9,415,829 B2
(45) Date of Patent: Aug. 16, 2016

(54) REAR WHEEL SUSPENSION STRUCTURE OF MOTORCYCLE

(71) Applicant: HONDA MOTOR CO., LTD., Tokyo (JP)

(72) Inventors: Takatoshi Ebinuma, Wako (JP); Kenji Kofuji, Wako (JP); Masayuki Fujita, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/689,310

(22) Filed: Apr. 17, 2015

(65) Prior Publication Data
US 2015/0307155 A1    Oct. 29, 2015

(30) Foreign Application Priority Data

Apr. 25, 2014  (JP) ................................. 2014-091455

(51) Int. Cl.
*B62K 19/30*  (2006.01)
*B62K 25/28*  (2006.01)
*B62K 11/04*  (2006.01)
*B62M 17/00*  (2006.01)

(52) U.S. Cl.
CPC ............... *B62K 25/283* (2013.01); *B62K 11/04* (2013.01); *B62K 19/30* (2013.01); *B62M 17/00* (2013.01)

(58) Field of Classification Search
CPC ....... B62K 19/30; B62K 25/283; B62K 11/04
See application file for complete search history.

(56) References Cited

U.S. PATENT DOCUMENTS

| | | | |
|---|---|---|---|
| 7,644,797 B2 * | 1/2010 | Kofuji | B62K 25/283 180/219 |
| 7,665,562 B2 * | 2/2010 | Utsumi | B62K 25/26 180/226 |
| 7,913,793 B2 * | 3/2011 | Kofuji | B62K 19/30 180/226 |
| 2009/0057046 A1 * | 3/2009 | Kofuji | B62K 19/30 180/226 |
| 2009/0152038 A1 * | 6/2009 | Nakamura | B62K 11/04 180/219 |
| 2013/0081894 A1 * | 4/2013 | Ishikawa | B62M 7/04 180/220 |
| 2013/0220721 A1 * | 8/2013 | Matsuda | B62K 11/04 180/220 |
| 2013/0270938 A1 * | 10/2013 | Matsuda | B60K 1/00 310/54 |
| 2014/0361512 A1 * | 12/2014 | Ishida | B62K 25/20 280/284 |
| 2015/0130209 A1 * | 5/2015 | Hamlin | B62J 17/02 296/78.1 |

FOREIGN PATENT DOCUMENTS

JP          2006-096272 A      4/2006

* cited by examiner

*Primary Examiner* — Joseph Rocca
*Assistant Examiner* — Gabriela C Craciun
(74) *Attorney, Agent, or Firm* — Birch, Stewart, Kolasch & Birch, LLP

(57) ABSTRACT

In a rear wheel suspension structure of a motorcycle includes a body frame, a swing arm swingably supported by the body frame through a pivot shaft and a drive shaft for transmitting drive power to a rear wheel. A drive shaft insertion hole is formed in the swing arm with the drive shaft being inserted in the insertion hole. The pivot shaft is arranged so as to overlap with the drive shaft insertion hole in a side view. The pivot shaft is provided as a one-side supporting shaft. Another-side supporting shaft is provided independent from each other on the left and right. A thrust bearing and a radial bearing are arranged between the swing arm and the one-side supporting shaft as well as the another-side supporting shaft provided in the swing arm.

20 Claims, 6 Drawing Sheets

REAR WHEEL SUSPENSION STRUCTURE OF MOTORCYCLE

CROSS-REFERENCE TO RELATED APPLICATIONS

The present application claims priority under 35 USC 119 to Japanese Patent Application No. 2014-091455 filed Apr. 25, 2014 the entire contents of which are hereby incorporated by reference.

BACKGROUND OF THE INVENTION

1. Field of the Invention

The present invention relates to a rear wheel suspension structure for a motorcycle.

2. Description of Background Art

Heretofore, a structure for the suspension of the rear wheel of a motorcycle is known wherein both ends of a swing arm are independently supported by a pair of pivot shafts provided in a body frame, through tapered roller bearings. See, for example, Japanese Patent Application Publication No. 2006-96272.

In the conventional structure by using the tapered roller bearing, thrust loads and radial loads received by the pivot shaft can be received by a single bearing, whereby a space for arranging parts can be utilized efficiently, and the swing arm can be moved smoothly to improve the comfort in traveling. However, there is a need to further improve the comfort during operation while arranging the bearing even more compactly.

SUMMARY AND OBJECTS OF THE INVENTION

The present invention has been made in view of the foregoing, and aims to arrange a bearing compactly and also improve the comfort during operation with respect to a rear wheel suspension structure of a motorcycle.

To achieve the above objective, according to an embodiment of the present invention a rear wheel suspension structure of a motorcycle includes a body frame (F); a swing arm (12, 112) swingably supported by the body frame (F) through a pivot shaft (21); and a drive shaft (29) for transmitting drive power to a rear wheel (3). An insertion hole (40) is provided into which the drive shaft (29) is inserted. The insertion hole (40) is formed in the swing arm (12, 112) wherein at least a part of the pivot shaft (21) is arranged so as to overlap with the insertion hole (40) in a side view. The pivot shaft (21) is provided as supporting shafts (51, 52) provided independent from each other on the left and right with a thrust bearing (61) and a radial bearing (62) arranged between the swing arm (12, 112). Supporting shafts (51, 52) are provided in the swing arm (12, 112).

According to an embodiment of the present invention, the thrust bearing and the radial bearing can be arranged compactly, and the swing arm can be moved smoothly, so that comfort in traveling can be improved.

According to an embodiment of the present invention, a small-diameter tip end portion (58) has a reduced diameter at the tip end of the supporting shaft (51, 52) and is provided with a collar (67) having a larger diameter than the outer diameter of the supporting shaft (51, 52) being provided in the small-diameter tip end portion (58) with the radial bearing (62) abutting on the collar (67).

According to an embodiment of the present invention, the supporting shaft can be formed compactly, while the collar enlarges the diameter of the part on which the radial bearing abuts, so that the radial bearing having a large diameter can be employed.

According to an embodiment of the present invention, the thrust bearing (61) has a larger diameter than the supporting shaft (51, 52) with the thrust bearing (61) abutting on the collar (67).

According to an embodiment of the present invention, the number of parts can be reduced, and the surfaces of the collar that abut on the thrust bearing and the radial bearing can be processed easily.

Further, according to an embodiment of the present invention, a bearing accommodation portion (66) accommodating the thrust bearing (61) is formed into a bottomed cylindrical shape.

According to an embodiment of the present invention, foreign matter and the like can be prevented from entering the thrust bearing, without using a dedicated sealing member or the like.

In addition, according to an embodiment of the present invention, a bearing accommodation portion (166) accommodating the thrust bearing (61) is formed into a bottomed cylindrical shape, by providing a cover member (183) in a cylindrical portion (65).

According to an embodiment of the present invention, the cylindrical portion can be formed into a through hole, can be processed easily, and manufacturing of the swing arm can also be made easy.

In the rear wheel suspension structure of a motorcycle according to an embodiment of the present invention, the thrust bearing and the radial bearing arranged between the swing arm and the supporting shafts are provided in the swing arm. Thus, the thrust bearing allows the bearing to be arranged compactly and can receive thrust load efficiently, while the radial bearing can receive radial load efficiently. Consequently, the thrust bearing and the radial bearing can be arranged compactly, and the swing arm can be moved smoothly, so that comfort in traveling can be improved.

Additionally, the collar having a larger diameter than the outer diameter of the supporting shaft is provided in the small-diameter tip end portion of the supporting shaft, and the radial bearing abuts on the collar. Thus, the supporting shaft can be formed compactly, while the collar enlarges the diameter of the part on which the radial bearing abuts, so that the radial bearing having a large diameter can be employed.

Moreover, since the thrust bearing abuts on the collar, the thrust bearing as well as the radial bearing can be received by a single collar. Accordingly, the number of parts can be reduced, and the surfaces of the collar that abut on the thrust bearing and the radial bearing can be processed easily.

Further, since the bearing accommodation portion accommodating the thrust bearing is formed into a bottomed cylindrical shape, foreign matter and the like can be prevented from entering the thrust bearing, without using a dedicated sealing member or the like.

In addition, since the bearing accommodation portion accommodating the thrust bearing is formed into a bottomed cylindrical shape by providing a cover member in a cylindrical portion, the cylindrical portion can be formed into a through hole. Thus, processing thereof is easy, and manufacturing of the swing arm can also be made easy.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
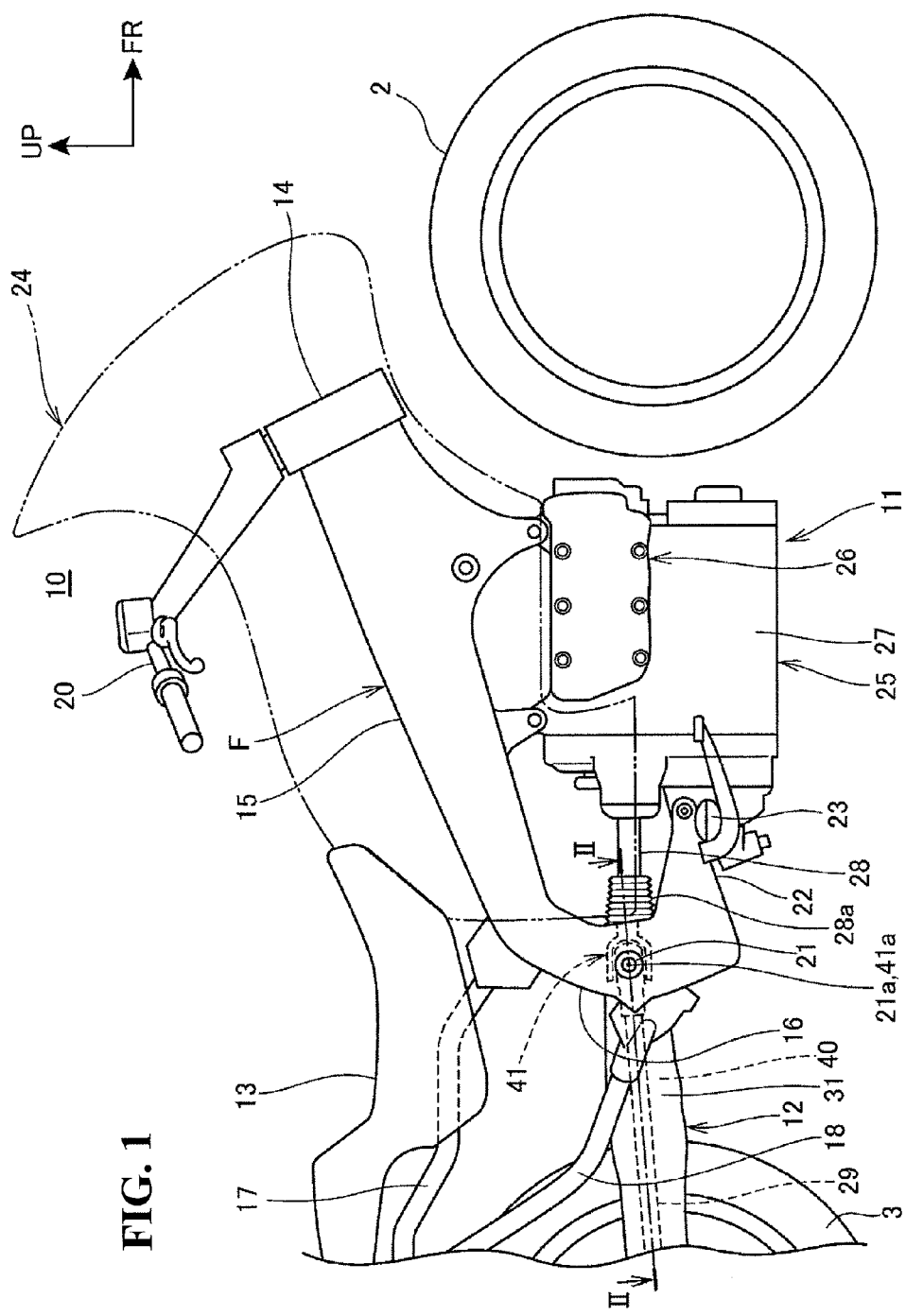
FIG. 1 is a right side view of a motorcycle, including a rear wheel suspension structure according to a first embodiment of the present invention.

Hereinafter, a description will be given of an embodiment of the present invention with reference to the drawings. Note that in the description, directions such as front and rear, left and right, and upper and lower are the same as the directions relative to the vehicle body, if not stated otherwise. Also, in the drawings, FR indicates the front of the vehicle body, UP indicates the upper direction of the vehicle body, and R indicates the right of the vehicle body.

FIG. 1 is a right side view of a motorcycle 10, including a rear wheel suspension structure according to a first embodiment of the present invention.

The motorcycle 10 is a vehicle in which an engine 11 is supported by a body frame F, a front fork (not shown) supporting a front wheel 2 is steerably supported by the front end of the body frame F, and a swing arm 12 from which a rear wheel 3 is suspended is provided on the rear side of the body frame F. The motorcycle 10 is a straddle type vehicle, having a seat 13 on which a rider sits in a straddling manner supported to the top of a rear portion of the body frame F.

The body frame F includes a front-end head pipe 14 pivotally supporting the front fork in a rotatable manner; paired left and right main frames 15 spreading in the vehicle width direction from the head pipe 14, and then extending rearwardly in a downwardly inclined manner; and paired left and right center frames 16 extending downwardly from the rear ends of the main frames 15. The body frame F also has paired left and right seat frames 17 extending to a rear portion of the vehicle from the rear end side of the main frames 15, and paired left and right sub frames 18 extending upwardly in the rear direction from lower portions of the center frames 16 and connected to rear portions of the seat frames 17.

A steering handle 20 is provided at the upper end of the front fork and extends rearwardly toward the rider's side. The seat 13 is supported by the seat frames 17 on the rear side of the center frames 16.

The swing arm 12 has its front end pivotally supported by a pivot shaft 21, which is inserted into middle portions in the vertical direction of the left and right center frames 16, and is swingable around the pivot shaft 21.

The left and right center frames 16 each includes a front extending portion 22 extending in a forward direction from a lower portion thereof, and a step 23 on which the rider sitting on the seat 13 places his/her foot is supported by the front extending portion 22 behind the engine 11. The left and right steps 23 extend outwardly in the vehicle width direction from the front extending portions 22.

The motorcycle 10 has a body cover 24 covering the body frame F and the like.

The engine 11 is a horizontally opposed engine including a crankcase 25 provided in a center portion in the vehicle width direction, and paired cylinder portions 26 protruding substantially horizontally to the left and right of outer sides of the crankcase 25 in the vehicle width direction. Note that the left cylinder portion is not shown.

The crankcase 25 has, in a lower portion thereof, a transmission case 27 accommodating a transmission (not shown), which reduces the output of a crankshaft and outputs it to the rear wheel 3 side. An output shaft 28 of the transmission extends rearwardly from a rear face of the crankcase 25. The output shaft 28 is connected to the front end of a drive shaft 29 inserted inside the swing arm 12. The output of the engine 11 is transmitted to the rear wheel 3 through the drive shaft 29. A rear portion of the output shaft 28 is covered with a cover 28a.

Figure 2:
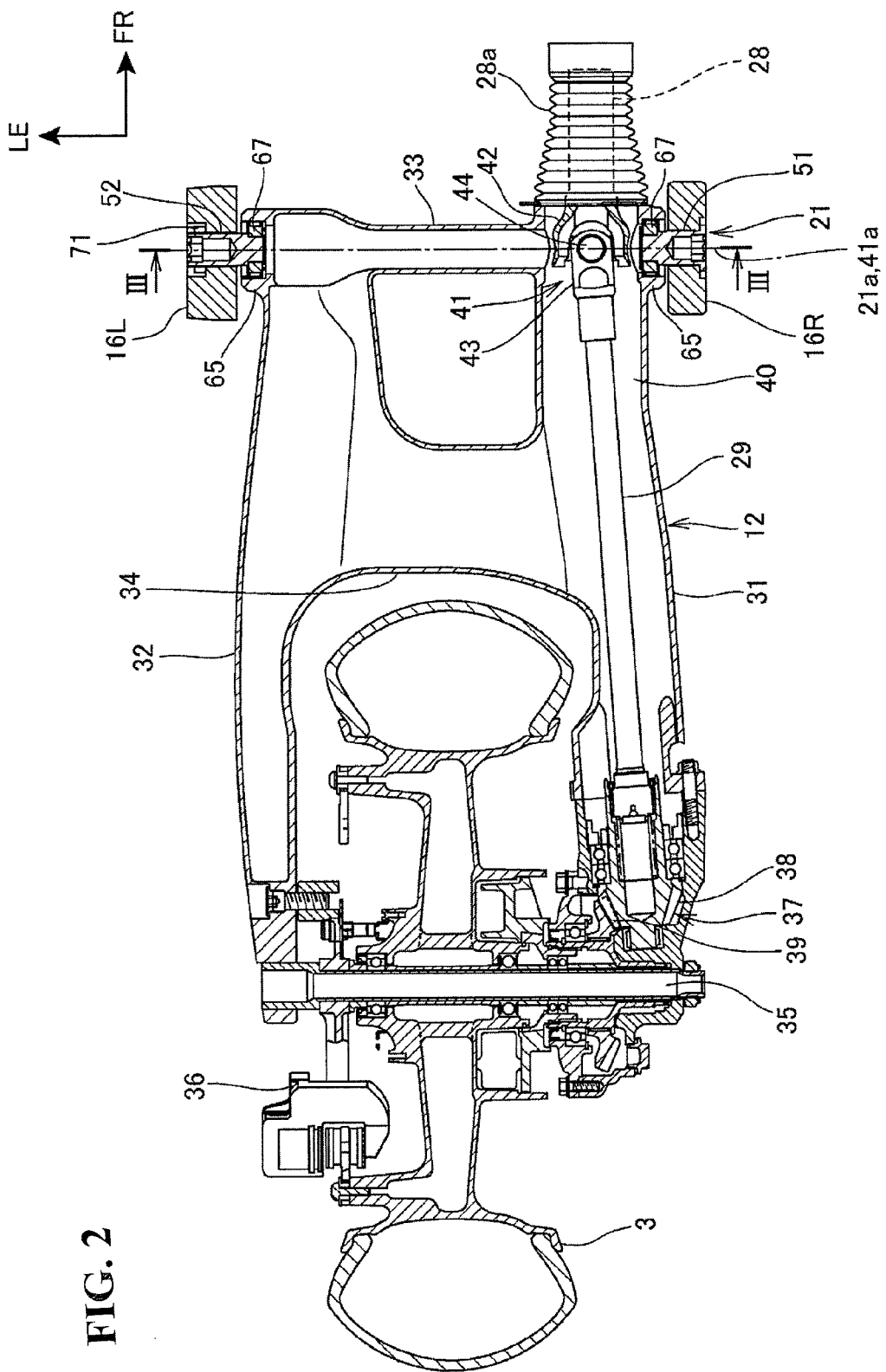
FIG. 2 is a cross-sectional view taken along II-II of FIG. 1.

FIG. 2 is a cross-sectional view taken along II-II of FIG. 1.

As shown in FIG. 2, the swing arm 12 includes an arm portion 31 on one side (hereinafter referred to as "one-side arm portion 31") positioned on the right side of the rear wheel 3; an arm portion 32 on the other side (hereinafter referred to as "other-side arm portion 32") positioned on the left side of the rear wheel 3; a front-end cross member 33 connecting the front ends of the one-side arm portion 31 and the other-side arm portion 32 in the vehicle width direction; and a rear cross member 34 connecting the one-side arm portion 31 and the other-side arm portion 32 in the vehicle width direction behind the front-end cross member 33.

The rear ends of the one-side arm portion 31 and the other-side arm portion 32 are connected by an axle 35. The rear wheel 3 is pivotally supported by the axle 35 behind the front-end cross member 33.

A braking device 36 for braking the rear wheel 3 is arranged between the other-side arm portion 32 and the rear wheel 3.

A final gear device 37, which decelerates rotation of the drive shaft 29 and transmits it to the rear wheel 3, is provided in a rear end portion of the one-side arm portion 31. The final gear device 37 includes a bevel gear 38 provided at the rear end of the drive shaft 29, and a ring gear 39 that meshes with the bevel gear 38 and rotates together with the rear wheel 3.

The entire swing arm 12 is formed into a hollow shape. A section between the front end and rear portion of the one-side arm portion 31 in the interior space of the one-side arm portion 31 is a drive shaft insertion hole 40 (insertion hole), into which the drive shaft 29 is inserted. The drive shaft 29 is arranged inside the drive shaft insertion hole 40, and is connected to the output shaft 28 of the engine 11, inside a front end portion of the drive shaft insertion hole 40.

More specifically, since the drive shaft 29 swings together with the swing arm 12, the output shaft 28 and the drive shaft 29 are connected through a universal joint 41. The universal joint 41 includes an input yoke 42 coupled to the rear end of the output shaft 28, an output yoke 43 coupled to the front end of the drive shaft 29, and a joint cross 44 connecting the input yoke 42 and the output yoke 43 through a roller bearing. A central axis of rotation 41a of the universal joint 41, as the center of bending of the vertical bending motion of the output yoke 43 relative to the input yoke 42, is coaxially aligned with a pivot shaft line 21a of the pivot shaft 21.

Figure 3B:
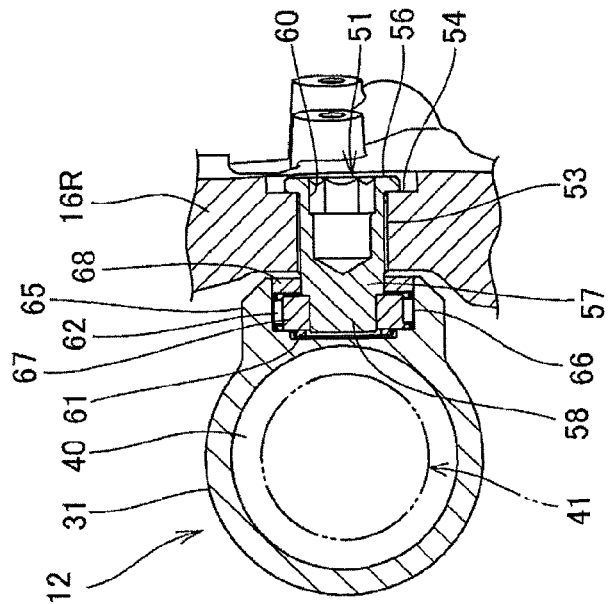
FIG. 3(a) is a cross-sectional view taken along III-III of FIG. 2 on the left side of the rear wheel suspension structure and FIG. 3(b) is a cross-sectional view taken along III-III of FIG. 2 on the right side of the rear wheel suspension structure.
Figure 3A:
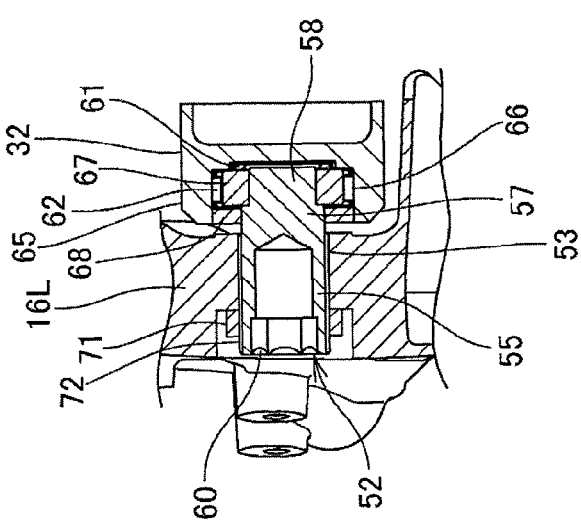

FIG. 3(a) is a cross-sectional view taken along of FIG. 2 on the left side of the rear wheel suspension structure and FIG. 3(b) is a cross-sectional view taken along III-III of FIG. 2 on the right side of the rear wheel suspension structure.

As shown in FIGS. 2, 3(a) and 3(b), the pivot shaft 21 includes a supporting shaft 51 on one side (supporting shaft) (hereinafter referred to as "one-side supporting shaft 51") provided in the right center frame 16R, and a supporting shaft 52 on the other side (supporting shaft) (hereinafter referred to as "other-side supporting shaft 52") provided in the left center frame 16L, which are independent from each other on the left and right and form a pair. The one-side supporting shaft 51 and the other-side supporting shaft 52 are arranged coaxially.

The swing arm 12 has its front end portion arranged between the center frame 16R and the center frame 16L, and is pivotally supported by the one-side supporting shaft 51 and the other-side supporting shaft 52 inserted into its front end portion from outside in the vehicle width direction.

More specifically, the drive shaft 29 can be arranged between the one-side supporting shaft 51 and the other-side supporting shaft 52 at a position where it overlaps with the one-side supporting shaft 51 in side view, since the one-side supporting shaft 51 and the other-side supporting shaft 52 do not penetrate the swing arm 12. To be specific, the one-side supporting shaft 51 is arranged in a position where it overlaps with a front end portion of the drive shaft insertion hole 40 and a front end portion of the drive shaft 29 in a side view of FIG. 1. To be more specific, the pivot shaft line 21a of the one-side supporting shaft 51 and the central axis of rotation 41a of the universal joint 41 are provided coaxially. By thus arranging the pivot shaft line 21a and the central axis of rotation 41a coaxially, the center of oscillation of the swing arm 12 and the center of rotation of the drive shaft 29 can be aligned, so that the swing arm 12 can be swung smoothly. Thus, a change in the position of the drive shaft 29 at the time of the swinging can be reduced.

The swing arm 12 is pivotally supported by the one-side supporting shaft 51 and the other-side supporting shaft 52, through a thrust bearing 61 and a radial bearing 62 respectively provided on front end portions of the one-side arm portion 31 and the other-side arm portion 32, and swings vertically around the one-side supporting shaft 51 and the other-side supporting shaft 52.

In the embodiment, supporting structures of the one-side arm portion 31 and the other-side arm portion 32 are formed substantially symmetrically. For this reason, the supporting structure of the one-side arm portion 31 will be described in detail. As for the supporting structure of the other-side arm portion 32, parts that are the same as those of the supporting structure of the one-side arm portion 31 are assigned the same reference numerals and descriptions thereof are omitted. Only different parts will be described in detail below.

Figure 4:
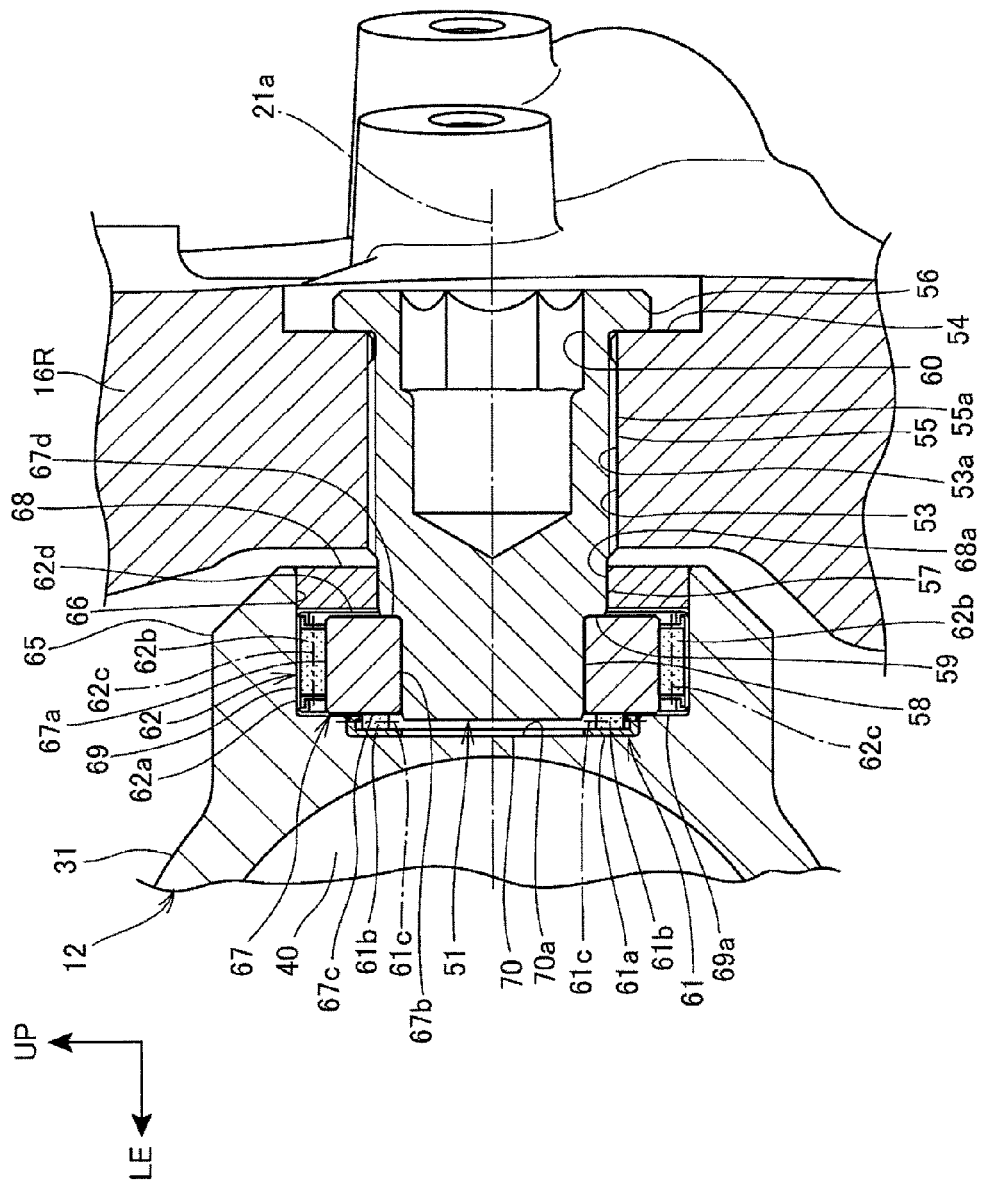
FIG. 4 is an enlarged view of a supporting structure of an arm portion on one side, shown in FIG. 3(b)

FIG. 4 is an enlarged view of the supporting structure of the one-side arm portion 31, shown in FIG. 3(b).

Referring to FIGS. 3(b) and 4, the center frame 16R includes a pivot shaft supporting hole portion 53 penetrating the center frame 16R in the vehicle width direction, and a concave seat portion 54 formed in an outer side face of the center frame 16R in such a manner so as to be continuous with the pivot shaft supporting hole portion 53. An internal thread portion 53(a) is provided in an inner circumferential face of the pivot shaft supporting hole portion 53.

The one-side supporting shaft 51 includes a fixed shaft portion 55 inserted into the pivot shaft supporting hole portion 53 of the center frame 16R; a flange portion 56 formed so as to have a larger diameter than the fixed shaft portion 55, in a proximal end portion of the one-side supporting shaft 51; an extended portion 57 extending further inward in the vehicle width direction than the inner side face of the center frame 16R from the fixed shaft portion 55; and a small-diameter tip end portion 58 formed so as to have a smaller diameter than the extended portion 57 and the fixed shaft portion 55, on the tip end side of the one-side supporting shaft 51. Since the small-diameter tip end portion 58 has a smaller diameter than the extended portion 57, a stepped portion 59, which is annular in an axial view, is formed on an end face of the extended portion 57 in the axial direction.

The fixed shaft portion 55 has, on an outer circumferential face thereof, an external thread portion 55a to be screwed onto the internal thread portion 53(a) of the pivot shaft supporting hole portion 53. A tool hole 60 for inserting a tool used to screw the one-side supporting shaft 51 is provided in the proximal end portion of the one-side supporting shaft 51. The one-side supporting shaft 51 is axially positioned by screwing the fixed shaft portion 55 into the pivot shaft supporting hole portion 53, and allowing the flange portion 56 to abut on the seat portion 54.

The thrust bearing 61 is a thin-plate needle bearing including a ring-shaped holding plate 61a, and multiple cylindrical rollers 61b arranged radially on the ring-shaped holding plate 61a. An axis 61c of each of the cylindrical rollers 61b is substantially orthogonal to the pivot shaft line 21a.

The radial bearing 62 is a cylindrical needle bearing including a cylindrical holding tube 62a, and multiple cylindrical rollers 62b arranged on an outer circumferential portion of the holding tube 62a in such a manner so as to be spaced apart in the circumferential direction. An axis 62c of each of the cylindrical rollers 62b is substantially parallel to the pivot shaft line 21a.

The plate thickness of the thrust bearing 61 is smaller than the axial length of the radial bearing 62, and an outer diameter D3 of the thrust bearing 61 is smaller than the inner diameter of the radial bearing 62.

The one-side arm portion 31 has a cylindrical tube portion 65 protruding outwardly in the vehicle width direction from an outer side face of a front end portion thereof, and has a bearing accommodation portion 66 on the inner circumference side of the tube portion 65. The thrust bearing 61, the radial bearing 62, a bearing block 67 (collar) that fits onto the one-side supporting shaft 51, and a sealing member 68 for sealing the bearing accommodation portion 66 are provided in the bearing accommodation portion 66.

The part of the one-side arm portion 31 including the drive shaft insertion hole 40 is formed into a pipe shape having a substantially circular cross section. The drive shaft insertion hole 40 and the bearing accommodation portion 66 are separated by a bottom face portion of the bearing accommodation portion 66.

The bearing accommodation portion 66 includes a radial bearing accommodation portion 69 accommodating the radial bearing 62, and a thrust bearing accommodation portion 70 accommodating the thrust bearing 61. The thrust bearing accommodation portion 70 is formed integrally with the base material constituting the one-side arm portion 31, has a bottomed cylindrical shape, and is formed so as to dig a step further from a center portion of a bottom portion of the radial bearing accommodation portion 69 in the axial direction. The shape of the bearing accommodation portion 66 including the depressed portion is formed by machine work using an end mill or the like, for example.

To be specific, the thrust bearing 61 is provided in the thrust bearing accommodation portion 70 in such a manner so as to abut on a bottom face 70a of the thrust bearing accommodation portion 70 with its outer circumferential portion fitting into an inner circumferential portion of the thrust bearing accommodation portion 70.

Meanwhile, the radial bearing 62 is provided in the radial bearing accommodation portion 69 in such a manner so that its one end face in the axial direction abuts on a bottom face 69a of the radial bearing accommodation portion 69, and its outer circumferential portion fits into an inner circumferential portion of the radial bearing accommodation portion 69.

The bearing block 67 is a cylindrical block made of metal such as iron and steel, and is arranged so as to fit into an inner circumferential portion of the radial bearing 62. The bearing block 67 includes a sliding outer circumferential face 67a slidably abutting on the inner circumferential portion of the radial bearing 62, an inner circumferential portion 67b that fits into an outer circumferential portion of the small-diameter tip end portion 58 of the one-side supporting shaft 51, a sliding inner side face 67c slidably abutting on the cylindrical rollers 61b of the thrust bearing 61, and an outer side face 67d abutting on the stepped portion 59 of the one-side supporting shaft 51 on the opposite side of the sliding inner side face 67c.

The axial thickness of the bearing block 67 is smaller than the axial thickness of the radial bearing 62. Also, the axial length of the small-diameter tip end portion 58 is slightly larger than the axial thickness of the radial bearing 62. A gap is formed between the tip end of the small-diameter tip end portion 58 and the holding plate 61a of the thrust bearing 61.

The bearing block 67 is axially positioned by being pressed by the stepped portion 59 of the one-side supporting shaft 51 and thereby being interposed between the stepped portion 59 and the thrust bearing 61. The cylindrical rollers 61b of the thrust bearing 61 are provided so as to protrude outwardly in the vehicle width direction for a predetermined distance, from the bottom face 69a of the radial bearing accommodation portion 69. Thus, when the bearing block 67 is positioned by the stepped portion 59, it abuts on the cylindrical rollers 61b, but forms a gap between itself and the bottom face 69a.

The sealing member 68 is formed into a ring shape, and has, in its center, a hole 68a into which the extended portion 57 of the one-side supporting shaft 51 is fitted. The sealing member 68 is press-fitted into an end portion of the radial bearing accommodation portion 69, and is provided outside the radial bearing 62.

When the swing arm 12 swings, the radial bearing 62 slides relative to the sliding outer circumferential face 67a of the bearing block 67, and the thrust bearing 61 slides relative to the sliding inner side face 67c of the bearing block 67. By thus providing the radial bearing 62 and the thrust bearing 61 separately, and receiving the radial bearing 62 and the thrust bearing 61 on the sliding outer circumferential face 67a and the sliding inner side face 67c of the single bearing block 67, the radial bearing 62 and the thrust bearing 61 can be arranged compactly, as well as axial. Thus, radial friction can be reduced to allow smooth swinging of the swing arm 12, whereby comfort in traveling can be improved.

Since the sliding outer circumferential face 67a and the sliding inner side face 67c are surfaces that slide relative to the cylindrical rollers 62b and the cylindrical rollers 61b, they are mirror-finished. The single bearing block 67 receives both of the thrust bearing 61 and the radial bearing 62 in the embodiment, and thus less parts need to be mirror-finished. Thus, machining man-hours can be reduced.

Figure 5:
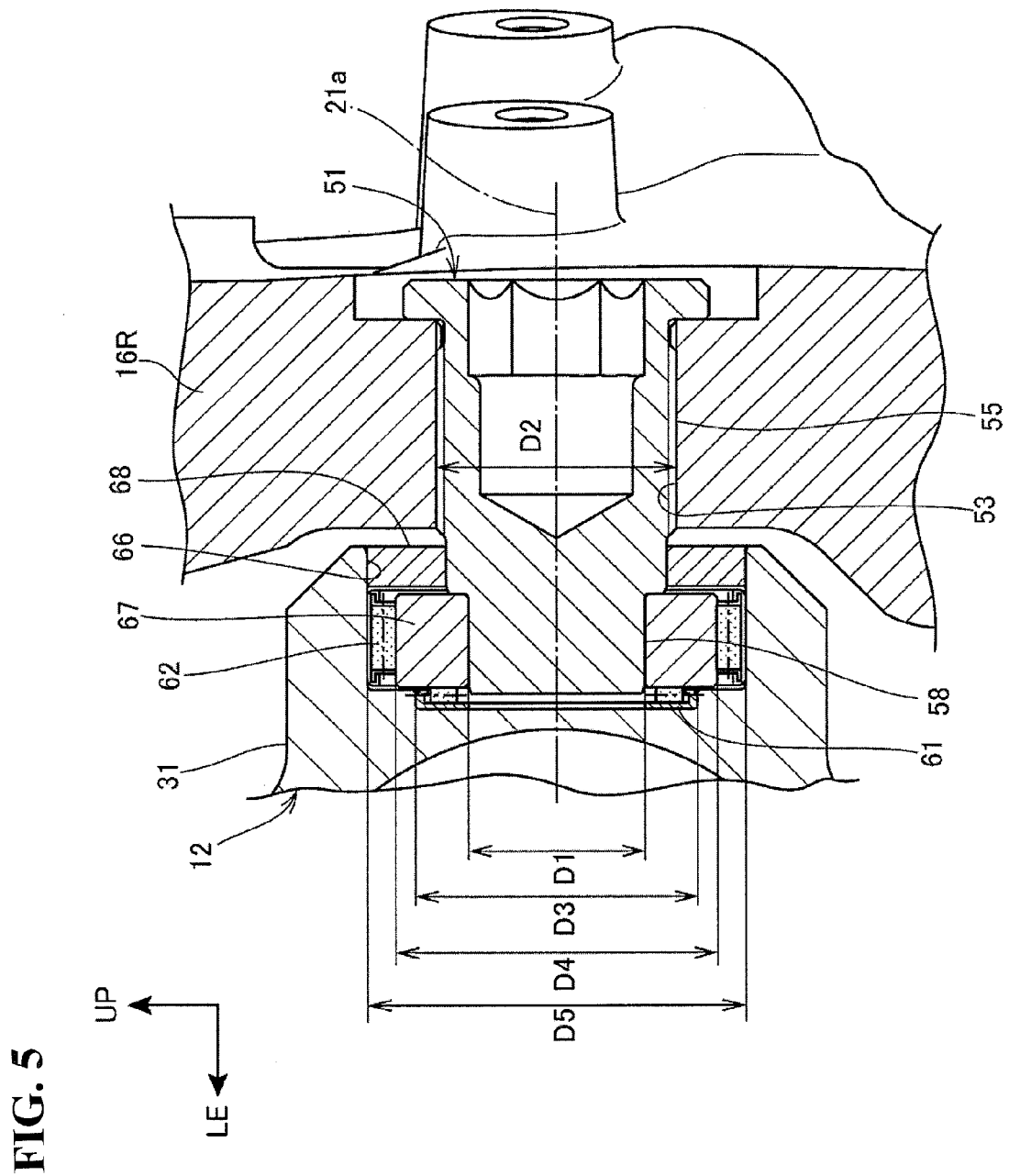
FIG. 5 is a cross-sectional view showing the size of parts in the periphery of a supporting shaft on one side.

FIG. 5 is a cross-sectional view showing the size of parts in the periphery of the one-side supporting shaft 51.

An outer diameter D1 of the small-diameter tip end portion 58 of the one-side supporting shaft 51 is smaller than an inner diameter D2 of the pivot shaft supporting hole portion 53 of the center frame 16R. The outer diameter D3 of the thrust bearing 61 is larger than the inner diameter D2 of the pivot shaft supporting hole portion 53. In addition, an outer diameter D4 of the bearing block 67 is larger than the outer diameter D3 of the thrust bearing 61. Moreover, an outer diameter D5 of the radial bearing 62 is larger than the outer diameter D4 of the bearing block 67.

Since the outer diameter D1 of the small-diameter tip end portion 58 is smaller than the inner diameter D2 of the pivot shaft supporting hole portion 53 in the embodiment, the one-side supporting shaft 51 can be easily attached to the pivot shaft supporting hole portion 53 from outside in the vehicle width direction. Also, since the small-diameter tip end portion 58 is provided with the bearing block 67 having the outer diameter D4 larger than the outer diameter D3 of the thrust bearing 61, the part for receiving the thrust bearing 61 can be formed sufficiently large while reducing the size of the one-side supporting shaft 51. Moreover, since the swing arm 12 is supported by the radial bearing 62, which has the outer diameter D5 larger than the outer diameter D3 of the thrust bearing 61 and the outer diameter D4 of the bearing block 67, the swing arm 12 can be supported securely.

As shown in FIG. 3(a), the other-side supporting shaft 52 includes the fixed shaft portion 55, the extended portion 57, and the small-diameter tip end portion 58. The other-side supporting shaft 52 does not have the flange portion 56 included in the one-side supporting shaft 51, but is provided with, on an outer circumferential portion of a part thereof corresponding to the flange portion 56, an external thread portion 72 into which a lock nut 71 is screwed. The lock nut is provided to fix the other-side supporting shaft 52 to the pivot shaft supporting hole portion 53 of the center frame 16L. The outer diameter of the external thread portion 72 is equal to the outer diameter of the fixed shaft portion 55.

The other-side arm portion 32 has the tube portion 65 on an outer side face of a front end portion thereof, and has the bearing accommodation portion 66 on the inner circumferential side of the tube portion 65. The thrust bearing 61, the radial bearing 62, the bearing block 67 that fits onto the other-side supporting shaft 52, and the sealing member 68 are provided in the bearing accommodation portion 66.

When attaching the swing arm 12 to the center frames 16R, 16L, the thrust bearing 61, the radial bearing 62, the bearing block 67, and the sealing member 68 are previously assembled to each bearing accommodation portion 66. The swing arm 12 is arranged between the center frames 16R, 16L, and the one-side supporting shaft 51 and the other-side supporting shaft 52 provided in the pivot shaft supporting hole portions 53, 53 are screwed in, so that the small-diameter tip end portions 58, 58 fit into the inner circumferential portions 67b of the bearing blocks 67, 67.

Firstly, the one-side supporting shaft 51 is screwed in such that the flange portion 56 abuts on the seat portion 54, whereby the one-side supporting shaft 51 is positioned in the axial direction. Next, the other-side supporting shaft 52 is screwed into the pivot shaft supporting hole portion 53 of the center frame 16L with a predetermined tightening torque. Thus, each of the thrust bearings 61 is axially compressed between the bearing block 67 and the thrust bearing accommodation portion 70. More specifically, the predetermined tightening torque is set to such an amount that a predetermined amount of pre-load can be applied to the thrust bearing 61. The rotational position of the other-side supporting shaft 52 is locked by fastening the lock nut 71, so that the aforementioned tightening torque can be maintained. When fastening the lock nut 71, the other-side supporting shaft 52 is locked by a tool inserted into the tool hole 60. Since pre-load of the thrust bearing 61 can be thus managed easily and accurately, the swing arm 12 can be swung smoothly.

As has been described, according to the first embodiment to which the present invention is applied, the rear wheel suspension structure of the motorcycle 10 includes the body frame F, the swing arm 12 swingably supported by the body frame F through the pivot shaft 21, and the drive shaft 29 for transmitting drive force to the rear wheel 3, the drive shaft insertion hole 40 into which the drive shaft 29 is inserted is formed in the swing arm 12, the one-side supporting shaft 51 is arranged so as to overlap with the drive shaft insertion hole 40 in a side view, the pivot shaft 21 is provided as the one-side supporting shaft 51 and the other-side supporting shaft 52 provided independent from each other on the left and right, and the swing arm 12 is provided with the thrust bearing 61 and the radial bearing 62, which are arranged between the swing arm 12 and the one-side supporting shaft 51 as well as the other-side supporting shaft 52. With this arrangement, the thrust bearing 61 allows the bearing to be arranged compactly and can receive thrust load efficiently, while the radial bearing 62 can receive radial load efficiently. Thus, the thrust bearing 61 and the radial bearing 62 can be arranged compactly, and the swing arm 12 can be swung smoothly, so that comfort in traveling on the motorcycle 10 can be improved.

Additionally, the small-diameter tip end portion 58 having a reduced diameter at the tip end of the one-side supporting shaft 51 and at the tip end of the other-side supporting shaft 52 is provided, the bearing block 67 having a larger diameter than the outer diameter of the fixed shaft portion 55 is provided in the small-diameter tip end portion 58, and the radial bearing 62 abuts on the bearing block 67. Thus, the one-side supporting shaft 51 and the other-side supporting shaft 52 can be formed compactly, while the bearing block 67 enlarges the diameter of the part on which the radial bearing 62 abuts, so that the radial bearing 62 having a large diameter can be employed.

Moreover, since the thrust bearing 61 has a larger diameter than the fixed shaft portion 55 and abuts on the bearing block 67, the thrust bearing 61 as well as the radial bearing 62 can be received by the single bearing block 67. Thus, the number of parts can be reduced, and the sliding inner side face 67*c* and the sliding outer circumferential face 67*a* that abut on the thrust bearing 61 and the radial bearing 62 can be processed easily.

Further, since the bearing accommodation portion 66 accommodating the thrust bearing 61 is formed into a bottomed cylindrical shape, foreign matter and the like can be prevented from entering the thrust bearing 61 side from the drive shaft insertion hole 40 side, without using a dedicated sealing member or the like on the bottom portion of the bearing accommodation portion 66.

Hereinafter, a description will be given of a second embodiment to which the present invention is applied, with reference to FIG. 6. In the second embodiment, parts configured in a similar manner as in the first embodiment are assigned the same reference numerals, and descriptions thereof are omitted.

In the description of the first embodiment, the thrust bearing accommodation portion 70 is formed integrally with the base material constituting the one-side arm portion 31, and has a bottomed cylindrical shape. However, the second embodiment is different from the first embodiment in that a thrust bearing accommodation portion 170 is configured of a cover member 183 closing a bottom portion of a bearing accommodation portion 166.

Figure 6:
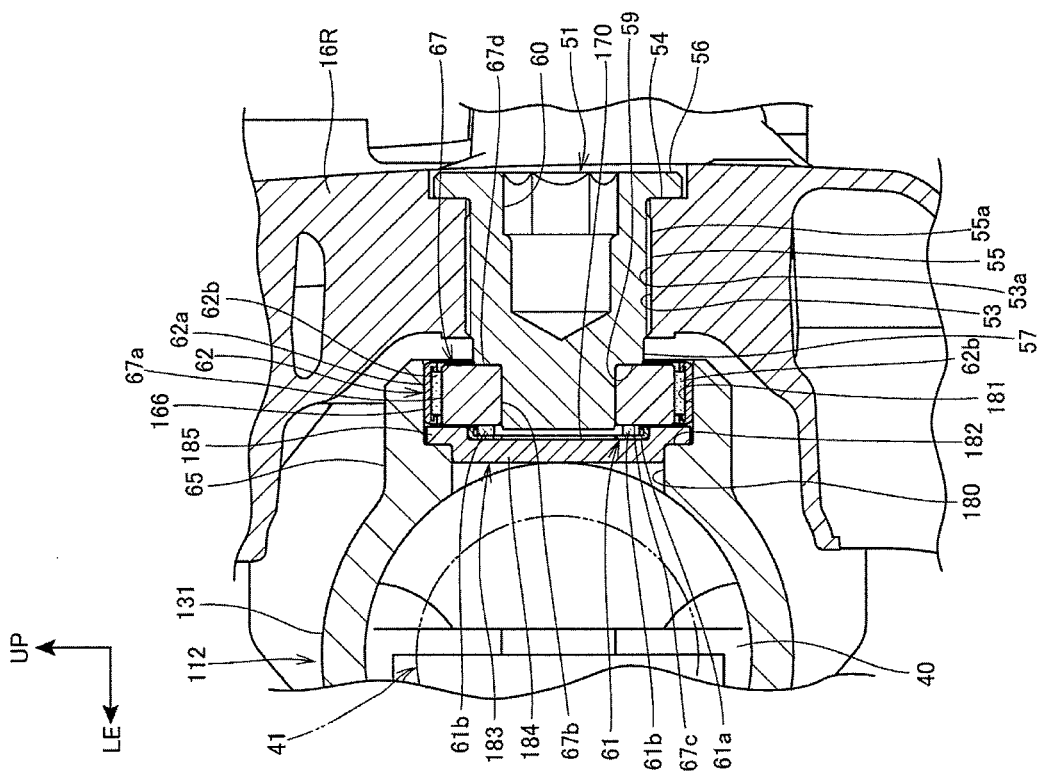
FIG. 6 is an enlarged view of a supporting structure of an arm portion on one side, according to a second embodiment.

FIG. 6 is an enlarged view of a supporting structure of an arm portion 131 on one side (hereinafter referred to as "one-side arm portion 131"), according to a second embodiment.

A swing arm 112 includes one-side arm portion 131 with a tube portion 65 in a front end portion thereof, and has the bearing accommodation portion 166 on the inner circumferential side of the tube portion 65. The swing arm 112 has the same configuration as the swing arm 12 of the first embodiment, except for the configuration of the bearing accommodation portion 166.

The bearing accommodation portion 166 includes a through hole portion 180 communicating into a drive shaft insertion hole 40, a bearing support hole portion 181 having a larger diameter than the through hole portion 180 and provided outside the through hole portion 180 in the vehicle width direction, and an annular stepped portion 182 formed along the border between the bearing support hole portion 181 and the through hole portion 180. The shapes of the through hole portion 180, the stepped portion 182, and the bearing support hole portion 181 are finished by machine work. Since the through hole portion 180 penetrates the bearing accommodation portion and the area of the stepped portion 182 is relatively small, the depth of the stepped portion 182 can be finished highly accurately and easily.

The through hole portion 180 is closed by the cover member 183 that abuts on the stepped portion 182.

The cover member 183 is a discoid plate member, and includes a lid portion 184 fitted to an inner circumferential portion of the through hole portion 180, as well as a collar portion 185 protruding outwardly in the radial direction from a fringe portion on one end of the lid portion 184. The cover member 183 closes the through hole portion 180 such that the lid portion 184 is fitted into the through hole portion 180, and the collar portion 185 is arranged so as to abut on the stepped portion 182. Thus, the cover member constitutes the bottom portion of the bearing accommodation portion 166.

The thrust bearing accommodation portion 170, which is recessed a step deeper toward the drive shaft insertion hole 40 side, is provided on an outer side face of the lid portion 184, i.e., on the bottom portion of the bearing accommodation portion 166, and accommodates a thrust bearing 61. The radial bearing 62 and the bearing block 67 are arranged outside the cover member 183 in the vehicle width direction, inside the bearing accommodation portion 166.

When the swing arm 112 is attached to the center frames 16R, 16L, a sliding inner side face 67*c* of a bearing block 67 abuts on cylindrical rollers 61*b* of the thrust bearing 61 but forms a gap between itself and the cover member 183.

The bearing accommodation portion 166 and the cover member 183 are also similarly provided in an arm portion on the other side.

As has been described, according to the second embodiment to which the present invention is applied, since the bearing accommodation portion 166 accommodating the thrust bearing 61 is formed into a bottomed cylindrical shape by providing the cover member 183 inside the tube portion 65, the through hole portion 180 can be provided in the tube portion 65, the bearing accommodation portion 166 can be processed easily, and manufacturing of the swing arm 112 can be made easy. Moreover, since the through hole portion 180 is closed with the cover member 183, foreign matter and the like can be prevented from entering the thrust bearing 61 side from the drive shaft insertion hole 40. In addition, the state around a universal joint 41 can be checked by detaching the cover member 183, and thus excellent maintainability can be achieved.

Note that the above embodiments show only an aspect to which the present invention is applied, and do not limit the invention.

Although the pivot shaft line 21a of the one-side supporting shaft 51 and the central axis of rotation 41a of the universal joint 41 are provided coaxially in the description of the first and second embodiments, the invention is not limited to this. It suffices that the one-side supporting shaft 51 be arranged so as to at least partially overlap with the drive shaft insertion hole 40 in a side view. By thus arranging the one-side supporting shaft 51 close to the drive shaft insertion hole 40, the center of oscillation of the swing arm 12, 112 and the center of rotation of the drive shaft 29 can be brought close to each other, so that the swing arm 12, 112 can be swung smoothly and a change in position of the drive shaft 29 at the time of the swinging can be reduced.

In addition, although the thrust bearing 61 and the radial bearing 62 are needle bearings respectively including the cylindrical rollers 61b and the cylindrical rollers 62b in the description of the first and second embodiments, the type of bearing can be changed. The bearing may be a ball bearing including balls instead of cylindrical rollers, for example. Moreover, although the drive shaft 29 is provided in the one-side arm portion 31, it may be provided in a drive shaft insertion hole formed in the other-side arm portion 32.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A rear wheel suspension structure of a motorcycle comprising:
    a body frame;
    a swing arm swingably supported by the body frame through a pivot shaft, said pivot shaft including a first side supporting shaft formed on a first side of said pivot shaft and a second side supporting shaft formed on a second side of said pivot shaft;
    a drive shaft for transmitting drive power to a rear wheel; and
    an insertion hole being formed in said swing arm, said drive shaft being inserted into said insertion hole; wherein:
    at least a part of said pivot shaft is arranged so as to overlap with said insertion hole in a side view; and
    a thrust bearing and a radial bearing are operatively arranged between said swing arm and said first side and said second side supporting shafts.

2. The rear wheel suspension structure of a motorcycle according to claim 1, wherein:
    a small-diameter tip end portion having a reduced diameter is provided at a tip end of said supporting shaft;
    a collar having a larger diameter than the outer diameter of said supporting shaft is provided in the small-diameter tip end portion; and
    said radial bearing abuts on the collar.

3. The rear wheel suspension structure of a motorcycle according to claim 2, wherein:
    said thrust bearing has a larger diameter than said supporting shaft; and
    said thrust bearing abuts on said collar.

4. The rear wheel suspension structure of a motorcycle according to claim 1, wherein a bearing accommodation portion accommodating said thrust bearing is formed into a bottomed cylindrical shape.

5. The rear wheel suspension structure of a motorcycle according to claim 2, wherein a bearing accommodation portion accommodating said thrust bearing is formed into a bottomed cylindrical shape.

6. The rear wheel suspension structure of a motorcycle according to claim 3, wherein a bearing accommodation portion accommodating said thrust bearing is formed into a bottomed cylindrical shape.

7. The rear wheel suspension structure of a motorcycle according to claim 1, wherein a bearing accommodation portion accommodating said thrust bearing is formed into a bottomed cylindrical shape, by providing a cover member in a cylindrical tube portion.

8. The rear wheel suspension structure of a motorcycle according to claim 2, wherein a bearing accommodation portion accommodating said thrust bearing is formed into a bottomed cylindrical shape, by providing a cover member in a cylindrical tube portion.

9. The rear wheel suspension structure of a motorcycle according to claim 3, wherein a bearing accommodation portion accommodating said thrust bearing is formed into a bottomed cylindrical shape, by providing a cover member in a cylindrical tube portion.

10. The rear wheel suspension structure of a motorcycle according to claim 1, wherein the swing arm includes a one-side arm portion with a laterally projecting tube portion and a bearing accommodation portion accommodating said thrust bearing is formed in said laterally projecting tube portion.

11. A rear wheel suspension structure of a motorcycle comprising:
    a swing arm adapted to be swingably supported by a body frame through a pivot shaft, said pivot shaft including a first side supporting shaft formed on a first side of said pivot shaft and a second side supporting shaft formed on a second side of said pivot shaft;
    a drive shaft adapted to transmit drive power; and
    said swing arm being hollow to receive said drive shaft being inserted into said hollow swing arm; wherein:
    at least a part of said pivot shaft is arranged so as to overlap with an insertion hole in a side view; and
    a thrust bearing and a radial bearing are operatively arranged between said swing arm and said first side and second side supporting shafts.

12. The rear wheel suspension structure of a motorcycle according to claim 11, wherein:
    a small-diameter tip end portion having a reduced diameter is provided at a tip end of said supporting shaft;
    a collar having a larger diameter than the outer diameter of said supporting shaft is provided in the small-diameter tip end portion; and
    said radial bearing abuts on the collar.

13. The rear wheel suspension structure of a motorcycle according to claim 12, wherein:
    said thrust bearing has a larger diameter than said supporting shaft; and
    said thrust bearing abuts on said collar.

14. The rear wheel suspension structure of a motorcycle according to claim 11, wherein a bearing accommodation portion accommodating said thrust bearing is formed into a bottomed cylindrical shape.

15. The rear wheel suspension structure of a motorcycle according to claim 12, wherein a bearing accommodation portion accommodating said thrust bearing is formed into a bottomed cylindrical shape.

16. The rear wheel suspension structure of a motorcycle according to claim 13, wherein a bearing accommodation portion accommodating said thrust bearing is formed into a bottomed cylindrical shape.

17. The rear wheel suspension structure of a motorcycle according to claim 11, wherein a bearing accommodation portion accommodating said thrust bearing is formed into a bottomed cylindrical shape, by providing a cover member in a cylindrical tube portion.

18. The rear wheel suspension structure of a motorcycle according to claim 12, wherein a bearing accommodation portion accommodating said thrust bearing is formed into a bottomed cylindrical shape, by providing a cover member in a cylindrical tube portion.

19. The rear wheel suspension structure of a motorcycle according to claim 13, wherein a bearing accommodation portion accommodating said thrust bearing is formed into a bottomed cylindrical shape, by providing a cover member in a cylindrical tube portion.

20. The rear wheel suspension structure of a motorcycle according to claim 11, wherein the swing arm includes a one-side arm portion with a laterally projecting tube portion and a bearing accommodation portion accommodating said thrust bearing is formed in said laterally projecting tube portion.

* * * * *